US012752814B2

(12) United States Patent
Nassar et al.

(10) Patent No.: US 12,752,814 B2
(45) Date of Patent: Oct. 6, 2026

(54) ATTACK-SUSTAIN-RELEASE (ASR) ENVELOPES FOR INTUITIVE TUNING OF COLLABORATIVE DRIVING FEATURES

(71) Applicant: QUALCOMM Incorporated, San Diego, CA (US)

(72) Inventors: Mazen Medhat Mohamed El-Sayed Nassar, Munich (DE); Jan Veen, Hallbergmoos (DE); Sibylle Tanja Reber, Gröbenzell (DE); Ahmed Ehab Sadek Sayed Kamal, Munich (DE); Benjamin Gaudszun, Bibertal OT Schneckenhofen (DE)

(73) Assignee: QUALCOMM Incorporated, San Diego, CA (US)

( * ) Notice: Subject to any disclaimer, the term of this patent is extended or adjusted under 35 U.S.C. 154(b) by 490 days.

(21) Appl. No.: 18/327,221

(22) Filed: Jun. 1, 2023

(65) Prior Publication Data

US 2024/0400089 A1 Dec. 5, 2024

(51) Int. Cl.
*B60W 40/105* (2012.01)
*B60W 60/00* (2020.01)

(52) U.S. Cl.
CPC ........ *B60W 60/001* (2020.02); *B60W 40/105* (2013.01); *B60W 2520/125* (2013.01)

(58) Field of Classification Search
USPC .......................................................... 701/23
See application file for complete search history.

(56) References Cited

U.S. PATENT DOCUMENTS

2017/0358203 A1* 12/2017 MacNeille ............ B60Q 5/006
2019/0135286 A1* 5/2019 Domingo .............. B60W 30/02
2020/0086856 A1 3/2020 Park et al.
2022/0063716 A1 3/2022 Kim
2022/0234499 A1* 7/2022 Shmueli Friedland ...................... G10K 15/02

FOREIGN PATENT DOCUMENTS

EP 0900712 A2 3/1999
EP 0900712 B1 * 7/2002 ......... B62D 15/0285
EP 4039562 A1 8/2022

OTHER PUBLICATIONS

International Search Report and Written Opinion—PCT/US2024/024034—ISA/EPO—Jul. 10, 2024.

* cited by examiner

*Primary Examiner* — Adam D Tissot
*Assistant Examiner* — Laura E Linhardt
(74) *Attorney, Agent, or Firm* — QUALCOMM Incorporated

(57) ABSTRACT

Disclosed are techniques for operating a driver-in-the-loop (DIL) component of a vehicle. In an aspect, the DIL component receives a first input signal generated based on a first interaction of a driver with a component of the vehicle operating in an autonomous driving mode, applies an attack-sustain-release (ASR) envelope to an amplitude of the first input signal to generate a first output signal representing at least a ramp-in of driver control over the component from no driver control to full driver control, and wherein the ramp-in of the driver control is limited by application of the ASR envelope to the amplitude of the first input signal, and transmits the first output signal to a controller module for the component of the vehicle to enable the controller module to reduce control over the component of the vehicle based on the ramp-in of the driver control represented by the first output signal.

26 Claims, 7 Drawing Sheets

ATTACK-SUSTAIN-RELEASE (ASR) ENVELOPES FOR INTUITIVE TUNING OF COLLABORATIVE DRIVING FEATURES

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide higher data rates as compared to previous standards, more accurate positioning (e.g., based on reference signals for positioning (RS-P), such as downlink, uplink, or sidelink positioning reference signals (PRS)) and other technical enhancements.

Leveraging the increased data rates and decreased latency of 5G, among other things, vehicle-to-everything (V2X) communication technologies are being implemented to support autonomous driving applications, such as wireless communications between vehicles, between vehicles and the roadside infrastructure, between vehicles and pedestrians, etc.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

One or more aspects described herein relates to a method performed by a driver-in-the-loop (DIL) component of a vehicle includes receiving a first input signal generated based on a first interaction of a driver of the vehicle with a component of the vehicle operating in an autonomous driving mode; applying an attack-sustain-release (ASR) envelope to an amplitude of the first input signal to generate a first output signal, wherein the first output signal represents at least a ramp-in of driver control over the component of the vehicle from no driver control to full driver control, and wherein the ramp-in of the driver control is limited by application of the ASR envelope to the amplitude of the first input signal; and transmitting the first output signal to a controller module for the component of the vehicle to enable the controller module to reduce control over the component of the vehicle based on the ramp-in of the driver control represented by the first output signal.

One or more aspects described herein relates to an apparatus, including: one or more memories; one or more transceivers; and one or more processors communicatively coupled to the one or more memories and the one or more transceivers, the one or more processors, either alone or in combination, configured to: receive, via the one or more transceivers, a first input signal generated based on a first interaction of a driver of a vehicle with a component of the vehicle operating in an autonomous driving mode; apply an attack-sustain-release (ASR) envelope to an amplitude of the first input signal to generate a first output signal, wherein the first output signal represents at least a ramp-in of driver control over the component of the vehicle from no driver control to full driver control, and wherein the ramp-in of the driver control is limited by application of the ASR envelope to the amplitude of the first input signal; and transmit, via the one or more transceivers, the first output signal to a controller module for the component of the vehicle to enable the controller module to reduce control over the component of the vehicle based on the ramp-in of the driver control represented by the first output signal.

One or more aspects described herein relate to an apparatus, including: means for receiving a first input signal generated based on a first interaction of a driver of a vehicle with a component of the vehicle operating in an autonomous driving mode; means for applying an attack-sustain-release (ASR) envelope to an amplitude of the first input signal to generate a first output signal, wherein the first output signal represents at least a ramp-in of driver control over the component of the vehicle from no driver control to full driver control, and wherein the ramp-in of the driver control is limited by application of the ASR envelope to the amplitude of the first input signal; and means for transmitting the first output signal to a controller module for the component of the vehicle to enable the controller module to reduce control over the component of the vehicle based on the ramp-in of the driver control represented by the first output signal.

One or more aspects described herein relate to a non-transitory computer-readable medium storing computer-executable instructions that, when executed by a driver-in-the-loop (DIL) component, cause the DIL component to: receive a first input signal generated based on a first interaction of a driver of a vehicle with a component of the vehicle operating in an autonomous driving mode; apply an attack-sustain-release (ASR) envelope to an amplitude of the first input signal to generate a first output signal, wherein the first output signal represents at least a ramp-in of driver control over the component of the vehicle from no driver control to full driver control, and wherein the ramp-in of the driver control is limited by application of the ASR envelope to the amplitude of the first input signal; and transmit the first output signal to a controller module for the component of the vehicle to enable the controller module to reduce control over the component of the vehicle based on the ramp-in of the driver control represented by the first output signal.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
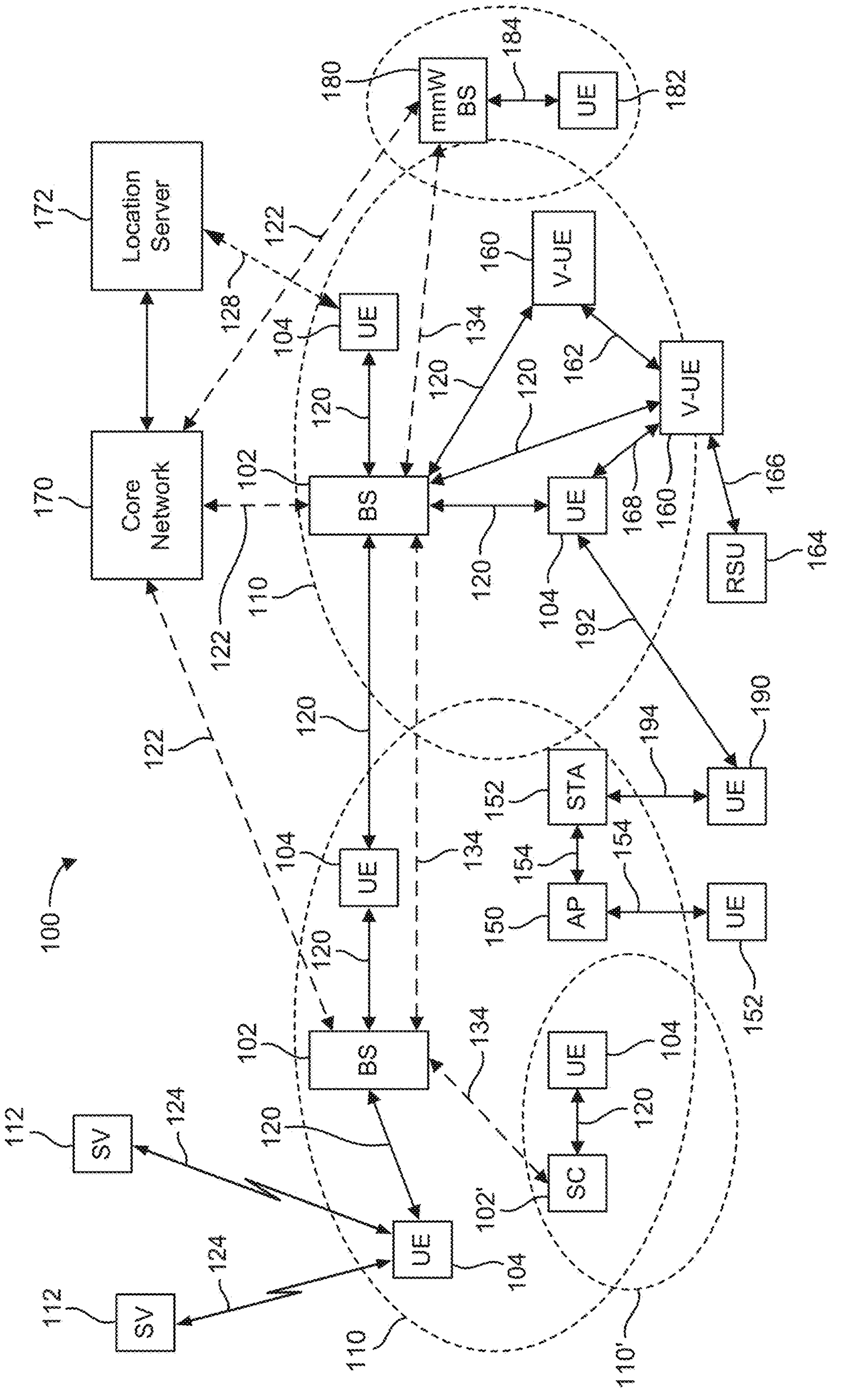
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

Various aspects relate generally to autonomous vehicles. Some aspects more specifically relate to driver interaction with autonomous features of the vehicle. In some examples, a driver-in-the-loop (DIL) component receives an input signal generated based on an interaction of a driver of a vehicle with a component of the vehicle operating in an autonomous driving mode. The DIL component applies an attack-sustain-release (ASR) envelope to an amplitude of the first input signal to generate a first output signal. The first output signal may represent at least a ramp-in of driver control over the component of the vehicle from no driver control to full driver control, and the ramp-in of the driver control may be limited by application of the ASR envelope to the amplitude of the first input signal. The DIL component may then transmit the first output signal to a controller module for the component of the vehicle to enable the controller module to reduce control over the component of the vehicle based on the ramp-in of the driver control represented by the first output signal.

Particular aspects of the subject matter described in this disclosure can be implemented to realize one or more of the following potential advantages. In some examples, by using the user-adjustable ASR envelope, the described techniques can be used to allow greater customization to the operation of the DIL component, which can in turn provide, for example, a more reactive feature and potentially safer behavior over greater operational domains.

The words “exemplary” and/or “example” are used herein to mean “serving as an example, instance, or illustration.” Any aspect described herein as “exemplary” and/or “example” is not necessarily to be construed as preferred or advantageous over other aspects. Likewise, the term “aspects of the disclosure” does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, “logic configured to” perform the described action.

As used herein, the terms “user equipment” (UE), “vehicle UE” (V-UE), “pedestrian UE” (P-UE), and “base station” are not intended to be specific or otherwise limited to any particular radio access technology (RAT), unless otherwise noted. In general, a UE may be any wireless communication device (e.g., vehicle on-board computer, vehicle navigation device, mobile phone, router, tablet computer, laptop computer, asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term “UE” may be referred to interchangeably as a “mobile device,” an “access terminal” or “AT,” a “client device,” a “wireless device,” a “subscriber device,” a “subscriber terminal,” a “subscriber station,” a “user terminal” or UT, a “mobile terminal,” a “mobile station,” or variations thereof.

A V-UE is a type of UE and may be any in-vehicle wireless communication device, such as a navigation system, a warning system, a heads-up display (HUD), an on-board computer, an in-vehicle infotainment system, an automated driving system (ADS), an advanced driver assistance system (ADAS), etc. Alternatively, a V-UE may be a portable wireless communication device (e.g., a cell phone, tablet computer, etc.) that is carried by the driver of the vehicle or a passenger in the vehicle. The term “V-UE” may refer to the in-vehicle wireless communication device or the vehicle itself, depending on the context. A P-UE is a type of UE and may be a portable wireless communication device that is carried by a pedestrian (i.e., a user that is not driving or riding in a vehicle). Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on Institute of Electrical and Electronics Engineers (IEEE) 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs including supporting data, voice and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference RF signals to UEs to be measured by the UEs and/or may receive and measure signals transmitted by the UEs. Such base stations may be referred to as positioning beacons (e.g., when transmitting RF signals to UEs) and/or as location measurement units (e.g., when receiving and measuring RF signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labelled "BS") and various UEs 104. The base stations 102 may include macro cell base stations (high power cellular base stations) and/or small cell base stations (low power cellular base stations). In an aspect, the macro cell base stations 102 may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. A location server 172 may be integrated with a base station 102. A UE 104 may communicate with a location server 172 directly or indirectly. For example, a UE 104 may communicate with a location server 172 via the base station 102 that is currently serving that UE 104. A UE 104 may also communicate with a location server 172 through another path, such as via an application server (not shown), via another network, such as via a wireless local area network (WLAN) access point (AP) (e.g., AP 150 described below), and so on. For signaling purposes, communication between a UE 104 and a location server 172 may be represented as an indirect connection (e.g., through the core network 170, etc.) or a direct connection (e.g., as shown via direct connection 128), with the intervening nodes (if any) omitted from a signaling diagram for clarity.

In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labelled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHZ). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MULTEFIRE®.

The wireless communications system 100 may further include a mmW base station 180 that may operate in millimeter wave (mmW) frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHZ with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

The electromagnetic spectrum is often subdivided, based on frequency/wavelength, into various classes, bands, channels, etc. In 5G NR two initial operating bands have been identified as frequency range designations FR1 (410 MHZ-7.125 GHZ) and FR2 (24.25 GHz-52.6 GHz). It should be understood that although a portion of FR1 is greater than 6 GHz. FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the INTERNATIONAL TELECOMMUNICATION UNION® as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHZ-71 GHZ), FR4 (52.6 GHZ-114.25 GHZ), and FR5 (114.25 GHZ-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example, an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect. SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

Leveraging the increased data rates and decreased latency of NR, among other things, vehicle-to-everything (V2X) communication technologies are being implemented to support intelligent transportation systems (ITS) applications, such as wireless communications between vehicles (vehicle-to-vehicle (V2V)), between vehicles and the roadside infrastructure (vehicle-to-infrastructure (V2I)), and between vehicles and pedestrians (vehicle-to-pedestrian (V2P)). The goal is for vehicles to be able to sense the environment around them and communicate that information to other vehicles, infrastructure, and personal mobile devices. Such vehicle communication will enable safety, mobility, and environmental advancements that current technologies are unable to provide. Once fully implemented, the technology is expected to reduce unimpaired vehicle crashes by 80%.

Still referring to FIG. 1, the wireless communications system 100 may include multiple V-UEs 160 that may communicate with base stations 102 over communication links 120 using the Uu interface (i.e., the air interface between a UE and a base station). V-UEs 160 may also communicate directly with each other over a wireless sidelink 162, with a roadside unit (RSU) 164 (a roadside access point) over a wireless sidelink 166, or with sidelink-capable UEs 104 over a wireless sidelink 168 using the PC5 interface (i.e., the air interface between sidelink-capable UEs). A wireless sidelink (or just "sidelink") is an adaptation of the core cellular (e.g., LTE, NR) standard that allows direct communication between two or more UEs without the communication needing to go through a base station. Sidelink communication may be unicast or multicast, and may be used for device-to-device (D2D) media-sharing. V2V communication, V2X communication (e.g., cellular V2X (cV2X) communication, enhanced V2X (eV2X) communication, etc.), emergency rescue applications, etc. One or more of a group of V-UEs 160 utilizing sidelink communications may be within the geographic coverage area 110 of a base station 102. Other V-UEs 160 in such a group may be outside the geographic coverage area 110 of a base station 102 or be otherwise unable to receive transmissions from a base station 102. In some cases, groups of V-UEs 160 communicating via sidelink communications may utilize a one-to-many (1:M) system in which each V-UE 160 transmits to every other V-UE 160 in the group. In some cases, a base station 102 facilitates the scheduling of resources for sidelink communications. In other cases, sidelink communications are carried out between V-UEs 160 without the involvement of a base station 102.

In an aspect, the sidelinks 162, 166, 168 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs.

In an aspect, the sidelinks 162, 166, 168 may be cV2X links. A first generation of cV2X has been standardized in LTE, and the next generation is expected to be defined in NR. cV2X is a cellular technology that also enables device-to-device communications. In the U.S. and Europe, cV2X is expected to operate in the licensed ITS band in sub-6 GHZ. Other bands may be allocated in other countries. Thus, as a particular example, the medium of interest utilized by sidelinks 162, 166, 168 may correspond to at least a portion of the licensed ITS frequency band of sub-6 GHZ. However, the present disclosure is not limited to this frequency band or cellular technology.

In an aspect, the sidelinks 162, 166, 168 may be dedicated short-range communications (DSRC) links. DSRC is a one-way or two-way short-range to medium-range wireless communication protocol that uses the wireless access for vehicular environments (WAVE) protocol, also known as IEEE 802.11p, for V2V, V2I, and V2P communications. IEEE 802.11p is an approved amendment to the IEEE 802.11 standard and operates in the licensed ITS band of 5.9 GHZ (5.85-5.925 GHZ) in the U.S. In Europe, IEEE 802.11p operates in the ITS G5A band (5.875-5.905 MHz). Other bands may be allocated in other countries. The V2V communications briefly described above occur on the Safety Channel, which in the U.S. is typically a 10 MHz channel that is dedicated to the purpose of safety. The remainder of the DSRC band (the total bandwidth is 75 MHZ) is intended for other services of interest to drivers, such as road rules, tolling, parking automation, etc. Thus, as a particular example, the mediums of interest utilized by sidelinks 162, 166, 168 may correspond to at least a portion of the licensed ITS frequency band of 5.9 GHZ.

Alternatively, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-NII) band used by wireless local area network (WLAN) technologies, most notably IEEE 802.11x WLAN technologies generally referred to as "Wi-Fi." Example systems of this type include different variants of CDMA systems, TDMA systems, FDMA systems, orthogonal FDMA (OFDMA) systems, single-carrier FDMA (SC-FDMA) systems, and so on.

Communications between the V-UEs 160 are referred to as V2V communications, communications between the V-UEs 160 and the one or more RSUs 164 are referred to as V2I communications, and communications between the V-UEs 160 and one or more UEs 104 (where the UEs 104 are P-UEs) are referred to as V2P communications. The V2V communications between V-UEs 160 may include, for example, information about the position, speed, acceleration, heading, and other vehicle data of the V-UEs 160. The V2I information received at a V-UE 160 from the one or more RSUs 164 may include, for example, road rules, parking automation information, etc. The V2P communications between a V-UE 160 and a UE 104 may include information about, for example, the position, speed, acceleration, and heading of the V-UE 160 and the position, speed (e.g., where the UE 104 is carried by a user on a bicycle), and heading of the UE 104.

Note that although FIG. 1 only illustrates two of the UEs as V-UEs (V-UEs 160), any of the illustrated UEs (e.g., UEs 104, 152, 182, 190) may be V-UEs. In addition, while only the V-UEs 160 and a single UE 104 have been illustrated as being connected over a sidelink, any of the UEs illustrated in FIG. 1, whether V-UEs, P-UEs, etc., may be capable of sidelink communication. Further, although only UE 182 was described as being capable of beam forming, any of the illustrated UEs, including V-UEs 160, may be capable of beam forming. Where V-UEs 160 are capable of beam forming, they may beam form towards each other (i.e., towards other V-UEs 160), towards RSUs 164, towards other UEs (e.g., UEs 104, 152, 182, 190), etc. Thus, in some cases, V-UEs 160 may utilize beamforming over sidelinks 162, 166, and 168.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WI-FI DIRECT®, BLUETOOTH®, and so on. As another example, the D2D P2P links 192 and 194 may be sidelinks, as described above with reference to sidelinks 162, 166, and 168.

Figure 2A:
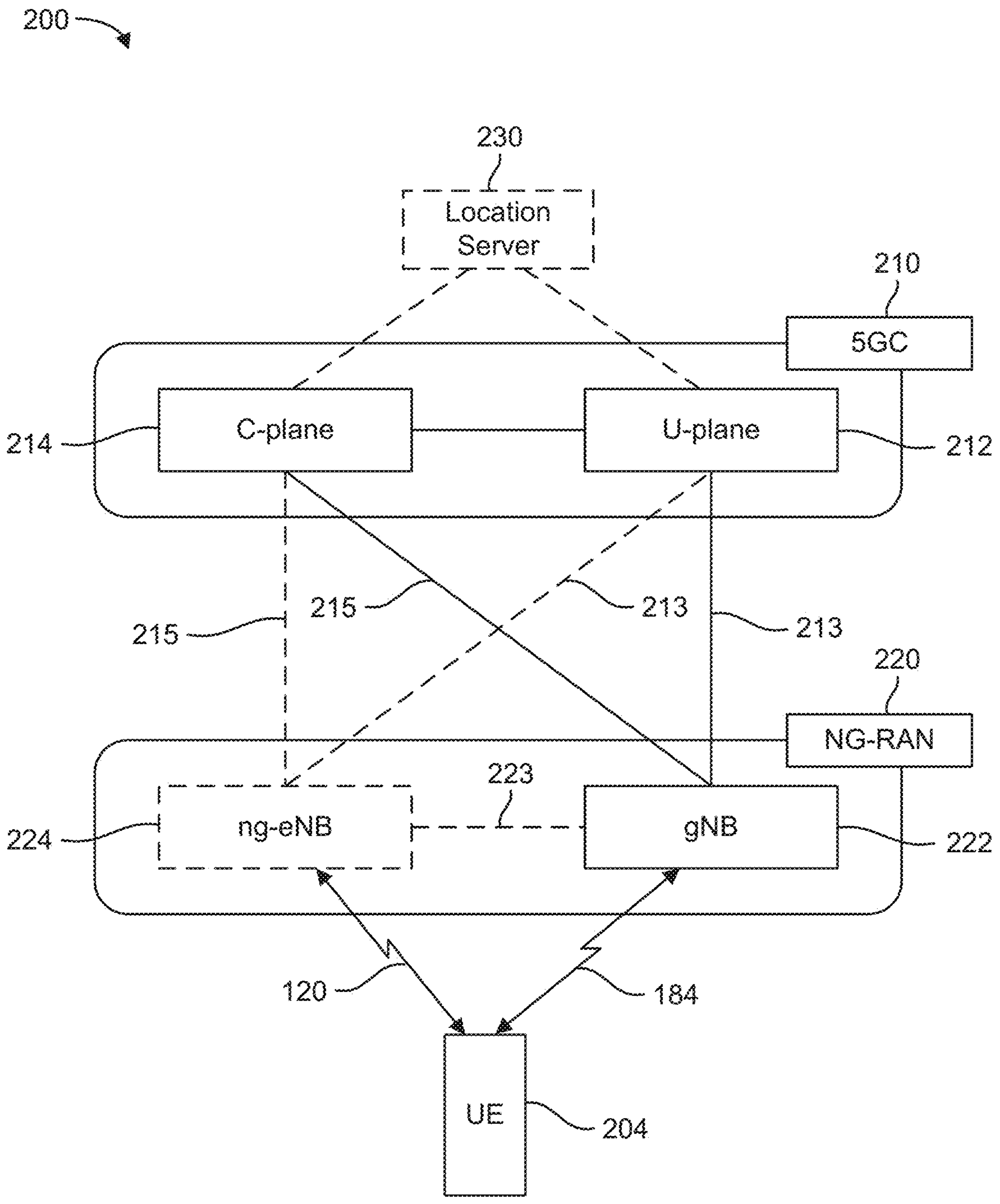
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212. (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
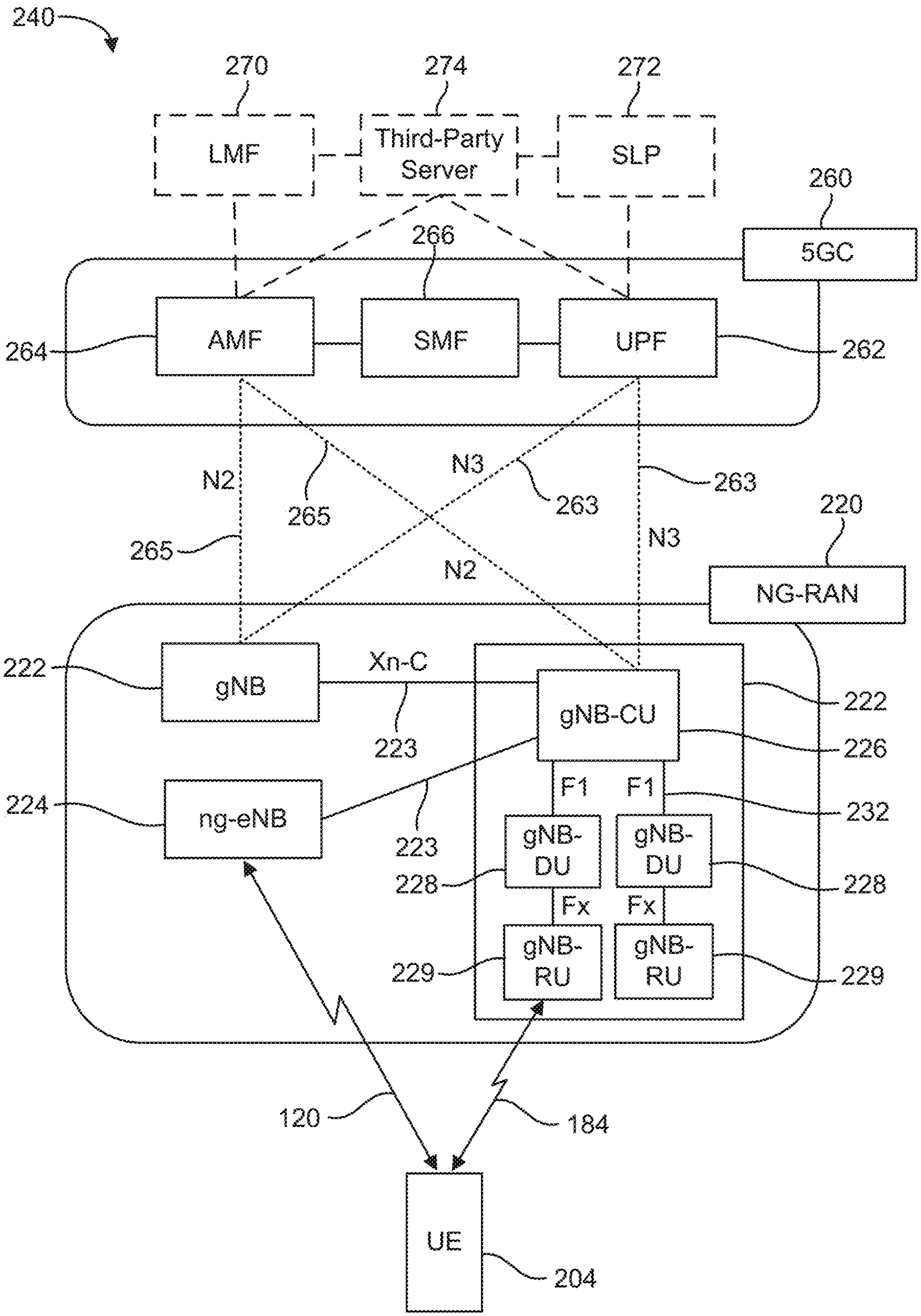

FIG. 2B illustrates another example wireless network structure 240. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP® (Third Generation Partnership Project) access networks.

Functions of the UPF 262 include acting as an anchor point for intra/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QOS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (e.g., third-party server 274) over a user plane (e.g., using protocols intended to carry voice and/or data like the transmission control protocol (TCP) and/or IP).

Yet another optional aspect may include a third-party server 274, which may be in communication with the LMF 270, the SLP 272, the 5GC 260 (e.g., via the AMF 264 and/or the UPF 262), the NG-RAN 220, and/or the UE 204 to obtain location information (e.g., a location estimate) for the UE 204. As such, in some cases, the third-party server 274 may be referred to as a location services (LCS) client or an external client. The third-party server 274 can be implemented as a plurality of separate servers (e.g., physically separate servers, different software modules on a single server, different software modules spread across multiple physical servers, etc.), or alternately may each correspond to a single server.

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 may be divided between a gNB central unit (gNB-CU) 226, one or more gNB distributed units (gNB-DUs) 228, and one or more gNB radio units (gNB-RUs) 229. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 generally host the radio resource control (RRC), service data adaptation protocol (SDAP), and packet data convergence protocol (PDCP) protocols of the gNB 222. A gNB-DU 228 is a logical node that generally hosts the radio link control (RLC) and medium access control (MAC) layer of the gNB 222. Its operation is controlled by the gNB-CU 226. One gNB-DU 228 can support one or more cells, and one cell is supported by only one gNB-DU 228. The interface 232 between the gNB-CU 226 and the one or more gNB-DUs 228 is referred to as the "F1" interface. The physical (PHY) layer functionality of a gNB 222 is generally hosted by one or more standalone gNB-RUs 229 that perform functions such as power amplification and signal transmission/reception. The interface between a gNB-DU 228 and a gNB-RU 229 is referred to as the "Fx" interface. Thus, a UE 204 communicates with the gNB-CU 226 via the RRC, SDAP, and PDCP layers, with a gNB-DU 228 via the RLC and MAC layers, and with a gNB-RU 229 via the PHY layer.

Autonomous and semi-autonomous driving safety technologies use a combination of hardware (sensors, cameras, and radar) and software to help vehicles identify certain safety risks so they can warn the driver to act (in the case of an advanced driver assistance system (ADAS)), or act themselves (in the case of an automated driving system (ADS)), to avoid a crash. A vehicle outfitted with an ADAS or ADS includes one or more camera sensors mounted on the vehicle that capture images of the scene in front of the vehicle, and also possibly behind and to the sides of the vehicle. Radar systems may also be used to detect objects along the road of travel, and also possibly behind and to the sides of the vehicle. Radar systems utilize RF waves to determine the range, direction, speed, and/or altitude of the objects along the road. More specifically, a transmitter transmits pulses of RF waves that bounce off any object(s) in their path. The pulses reflected off the object(s) return a small part of the RF waves' energy to a receiver, which is typically located at the same location as the transmitter. The camera and radar are typically oriented to capture their respective versions of the same scene.

A processor, such as a digital signal processor (DSP), within the vehicle analyzes the captured camera images and radar frames and attempts to identify objects within the captured scene. Such objects may be other vehicles, pedestrians, road signs, objects within the road of travel, etc. The radar system provides reasonably accurate measurements of object distance and velocity in various weather conditions. However, radar systems typically have insufficient resolution to identify features of the detected objects. Camera sensors, however, typically do provide sufficient resolution to identify object features. The cues of object shapes and appearances extracted from the captured images may provide sufficient characteristics for classification of different objects. Given the complementary properties of the two sensors, data from the two sensors can be combined (referred to as "fusion") in a single system for improved performance.

Modern vehicles are increasingly incorporating technology that helps drivers avoid drifting into adjacent lanes or making unsafe lane changes (e.g., lane departure warning (LDW)), or that warns drivers of other vehicles behind them when they are backing up, or that brakes automatically if a vehicle ahead of them stops or slows suddenly (e.g., forward collision warning (FCW)), among other things. The continuing evolution of automotive technology aims to deliver even greater safety benefits, and ultimately deliver ADS that can handle the entire task of driving without the need for user intervention.

There are six levels that have been defined to achieve full automation. At Level 0, the human driver does all the driving. At Level 1, an ADAS on the vehicle can sometimes assist the human driver with either steering or braking/accelerating, but not both simultaneously. At Level 2, an ADAS on the vehicle can itself actually control both steering and braking/accelerating simultaneously under some circumstances. The human driver must continue to pay full attention at all times and perform the remainder of the driving tasks. At Level 3, an ADS on the vehicle can itself perform all aspects of the driving task under some circumstances. In those circumstances, the human driver must be ready to take back control at any time when the ADS requests the human driver to do so. In all other circumstances, the human driver performs the driving task. At Level 4, an ADS on the vehicle can itself perform all driving tasks and monitor the driving environment, essentially doing all of the driving, in certain circumstances. The human need not pay attention in those circumstances. At Level 5, an ADS on the vehicle can do all the driving in all circumstances. The human occupants are just passengers and need never be involved in driving.

To further enhance ADAS and ADS systems, especially at Level 3 and beyond, autonomous and semi-autonomous vehicles may utilize high definition (HD) map datasets, which contain significantly more detailed information and true-ground-absolute accuracy than those found in current conventional resources. Such HD maps may provide accuracy in the 7-10 cm absolute ranges, highly detailed inventories of all stationary physical assets related to roadways, such as road lanes, road edges, shoulders, dividers, traffic signals, signage, paint markings, poles, and other data useful for the safe navigation of roadways and intersections by autonomous/semi-autonomous vehicles. HD maps may also provide electronic horizon predictive awareness, which enables autonomous/semi-autonomous vehicles to know what lies ahead.

Note that an autonomous or semi-autonomous vehicle may be, but need not be, a vehicle UE (V-UE). Likewise, a V-UE may be, but need not be, an autonomous or semi-autonomous vehicle. An autonomous or semi-autonomous vehicle is a vehicle outfitted with an ADAS or ADS. A V-UE is a vehicle with cellular connectivity to a 5G or other cellular network. An autonomous or semi-autonomous vehicle that uses, or is capable of using, cellular techniques for positioning and/or navigation is a V-UE.

Figure 3:
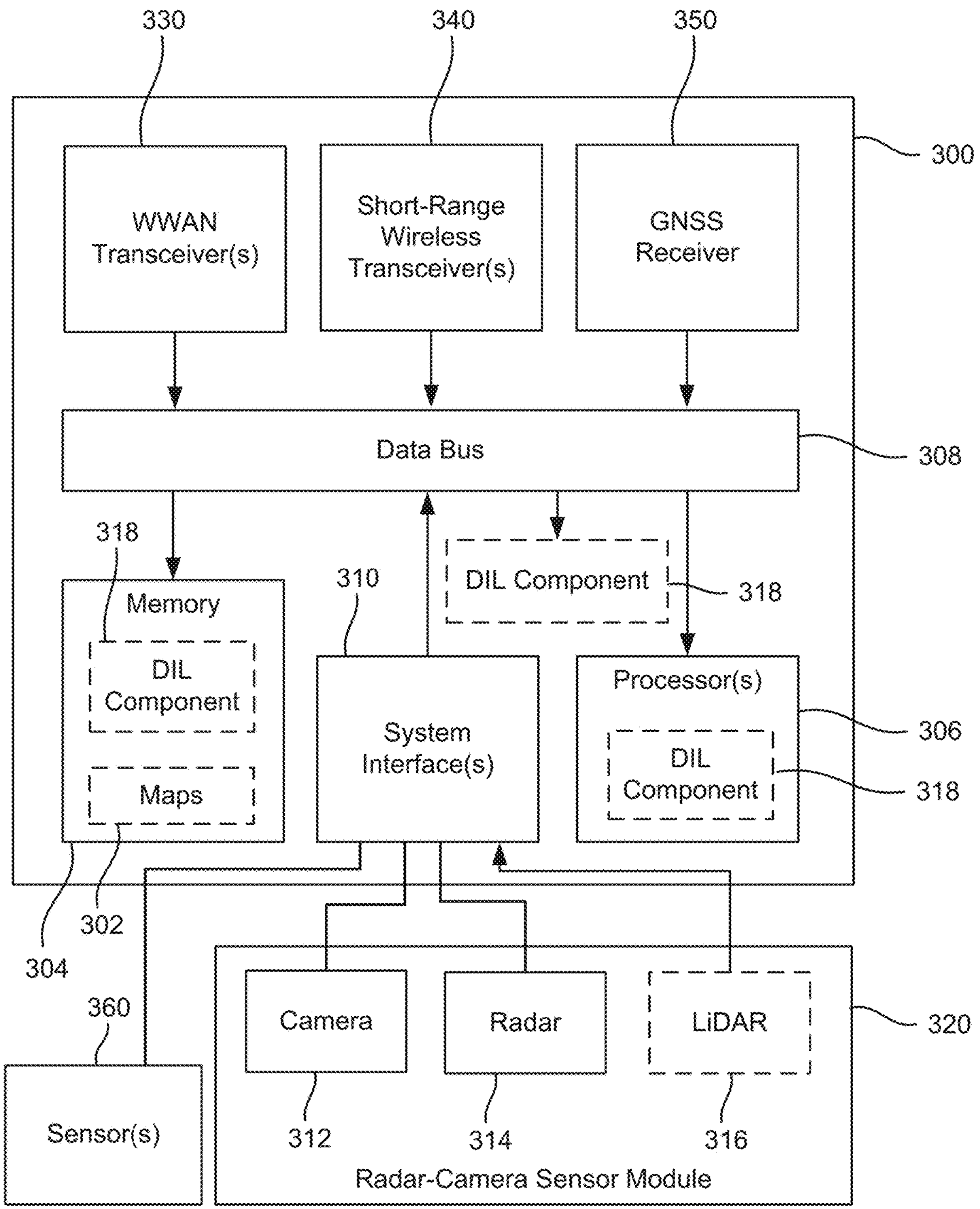
FIG. 3 illustrates an example on-board computer architecture, according to various aspects of the disclosure.

FIG. 3 illustrates an example architecture of an on-board computer (OBC) 300 of a vehicle, according to various aspects of the disclosure. In an aspect, the OBC 300 may be part of an ADAS or ADS of the vehicle. The OBC 300 may also be the V-UE of the vehicle. The OBC 300 includes a non-transitory computer-readable storage medium, i.e., memory 304, and one or more processors 306 in communication with the memory 304 via a data bus 308. The memory 304 includes one or more storage modules storing computer-readable instructions executable by the one or more processors 306 to perform the functions of the OBC 300 described herein. For example, the one or more processors 306 in conjunction with the memory 304 may implement the various operations described herein.

One or more radar-camera sensor modules 320 are coupled to the OBC 300 (only one is shown in FIG. 3 for simplicity). In some aspects, the radar-camera sensor module 320 includes at least one camera 312, at least one radar 314, and an optional light detection and ranging (LiDAR) sensor 316. The OBC 300 also includes one or more system interfaces 310 connecting the one or more processors 306, by way of the data bus 308, to the radar-camera sensor module 320 and, optionally, other vehicle sub-systems (not shown).

In an aspect, the camera 312 may capture image frames (also referred to herein as camera frames) of the scene within the viewing area of the camera 312 at some periodic rate. Likewise, the radar 314 may capture radar frames of the scene within the viewing area of the radar 314 at some periodic rate. The periodic rates at which the camera 312 and the radar 314 capture their respective frames may be the same or different. Each camera and radar frame may be timestamped. Thus, where the periodic rates are different, the timestamps can be used to select simultaneously, or nearly simultaneously, captured camera and radar frames for further processing (e.g., fusion).

The OBC 300 also includes, at least in some cases, one or more wireless wide area network (WWAN) transceivers 330 configured to communicate via one or more wireless communication networks (not shown), such as an NR network, an LTE network, a Global System for Mobile communication (GSM) network, and/or the like. The one or more WWAN transceivers 330 may be connected to one or more antennas (not shown) for communicating with other network nodes, such as other V-UEs, pedestrian UEs, infrastructure access points, roadside units (RSUs), base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The one or more WWAN transceivers 330 may be variously configured for transmitting and encoding signals (e.g., messages, indications, information, and so on), and, conversely, for receiving and decoding signals (e.g., messages, indications, information, pilots, and so on) in accordance with the designated RAT.

The OBC 300 also includes, at least in some cases, one or more short-range wireless transceivers 340 (e.g., a Wi-Fi transceiver, a BLUETOOTH® transceiver, etc.). The one or more short-range wireless transceivers 340 may be connected to one or more antennas (not shown) for communicating with other network nodes, such as other V-UEs, pedestrian UEs, infrastructure access points, RSUs, etc., via at least one designated RAT (e.g., cellular vehicle-to-everything (C-V2X), IEEE 802.11p (also known as wireless access for vehicular environments (WAVE)), dedicated short-range communication (DSRC), etc.) over a wireless communication medium of interest. The one or more short-range wireless transceivers 340 may be variously configured for transmitting and encoding signals (e.g., messages, indications, information, and so on), and, conversely, for receiving and decoding signals (e.g., messages, indications, information, pilots, and so on) in accordance with the designated RAT.

As used herein, a "transceiver" may include transmitter circuitry, receiver circuitry, or a combination thereof. A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. Wireless transmitter circuitry may include or be coupled to a plurality of antennas, such as an antenna array, that permits the respective apparatus (e.g., OBC 300) to perform transmit "beamforming," as described herein. Similarly, wireless receiver circuitry may include or be coupled to a plurality of antennas, such as an antenna array, that permits the respective apparatus (e.g., OBC 300) to perform receive beamforming, as described herein. In an aspect, the transmitter circuitry and receiver circuitry may share the same plurality of antennas, such that the respective apparatus can only receive or transmit at a given time, not both at the same time. A transceiver need not provide both transmit and receive functionalities in all designs. For example, a low functionality receiver circuit may be employed in some designs to reduce costs when providing full communication is not necessary (e.g., a receiver chip or similar circuitry simply providing low-level sniffing). A wireless transceiver (e.g., the one or more WWAN transceivers 330) may also include a network listen module (NLM) or the like for performing various measurements.

The OBC 300 also includes, at least in some cases, a global navigation satellite system (GNSS) receiver 350. The GNSS receiver 350 may be connected to one or more antennas (not shown) for receiving satellite signals. The GNSS receiver 350 may comprise any suitable hardware and/or software for receiving and processing GNSS signals. The GNSS receiver 350 requests information and operations as appropriate from the other systems, and performs the calculations necessary to determine the vehicle's position using measurements obtained by any suitable GNSS algorithm.

In an aspect, the OBC 300 may utilize the one or more WWAN transceivers 330 and/or the one or more short-range wireless transceivers 340 to download one or more maps 302 that can then be stored in memory 304 and used to obtain navigational map data for vehicle navigation. Map(s) 302 may be one or more HD maps, which may provide accuracy in the 7-10 cm absolute ranges, highly detailed inventories of all stationary physical assets related to roadways, such as road lanes, road edges, shoulders, dividers, traffic signals, signage, paint markings, poles, and other data useful for the safe navigation of roadways and intersections by the vehicle. Map(s) 302 may also provide electronic horizon predictive awareness, which enables the vehicle to know what lies ahead. The information about the road lanes may include the number, width, type (e.g., high-occupancy vehicle (HOV) or non-HOV), traffic direction, etc. of the lanes. Alternatively, the map(s) 302 may be more generic, or compressed, with roadways represented as linear segments and/or road headings. Thus, the navigational map data obtainable from map(s) 302 may range from the locations and dimensions of stationary physical assets related to roadways and pathways to only road headings.

One or more sensors 360 of the vehicle may be coupled to the one or more processors 306 via the one or more system interfaces 310. The one or more sensors 360 may provide means for sensing or detecting information related to the state and/or environment of the vehicle, such as speed, heading (e.g., compass heading), headlight status, gas mileage, etc. By way of example, the one or more sensors 360 may include an odometer a speedometer, a tachometer, an accelerometer (e.g., a micro-electrical mechanical system (MEMS) device), a gyroscope, a geomagnetic sensor (e.g., a compass), an altimeter (e.g., a barometric pressure altimeter), etc. Although shown as located outside the OBC 300, some of these sensors 360 may be located on the OBC 300 and some may be located elsewhere in the vehicle.

The OBC 300 may further include a driver-in-the-loop (DIL) component 318. The DIL component 318 may be a hardware circuit that is part of or coupled to the one or more processors 306 that, when executed, causes the OBC 300 to perform the functionality described herein. In other aspects, the DIL component 318 may be external to the one or more processors 306 (e.g., part of a positioning processing system, integrated with another processing system, etc.). Alternatively, the DIL component 318 may be one or more memory modules stored in the memory 304 that, when executed by the one or more processors 306 (or positioning processing system, another processing system, etc.), cause the OBC 300 to perform the functionality described herein. As a specific example, the DIL component 318 may comprise a plurality of positioning engines, a positioning engine aggregator, a sensor fusion module, and/or the like. FIG. 3 illustrates possible locations of the DIL component 318, which may be, for example, part of the memory 304, the one or more processors 306, or any combination thereof, or may be a standalone component.

Although not shown, the OBC 300 may include or be coupled to a user interface (e.g., a touchscreen) for providing indications (e.g., audible and/or visual indications) to a user and/or for receiving user input (e.g., upon user actuation of a sensing device such a keypad, a touch screen, a microphone, and so on).

For convenience, the OBC 300 is shown in FIG. 3 as including various components that may be configured according to the various examples described herein. It will be appreciated, however, that the illustrated components may have different functionality in different designs. In particular, various components in FIG. 3 are optional in alternative configurations and the various aspects include configurations that may vary due to design choice, costs, use of the device, or other considerations. For example, a particular implementation of OBC 300 may omit the WWAN transceiver(s) 330 (e.g., a V-UE may have Wi-Fi and/or BLUETOOTH® capability without cellular capability), or may omit the short-range wireless transceiver(s) 340 (e.g., cellular-only, etc.), and so on. For brevity, illustration of the various alternative configurations is not provided herein, but would be readily understandable to one skilled in the art.

The components of FIG. 3 may be implemented in various ways. In some implementations, the components of FIG. 3 may be implemented in one or more circuits such as, for example, one or more processors and/or one or more application-specific integrated circuits (ASICs) (which may include one or more processors). Here, each circuit may use and/or incorporate at least one memory component for storing information or executable code used by the circuit to provide this functionality. For simplicity, various operations, acts, and/or functions are described herein as being performed “by an OBC,” “by a V-UE,” “by a vehicle,” or the like. However, as will be appreciated, such operations, acts, and/or functions may actually be performed by specific components or combinations of components of the OBC 300, such as the one or more processors 306, the one or more transceivers 330 and 340, the memory 304, the DIL component 318, etc.

Figure 4:
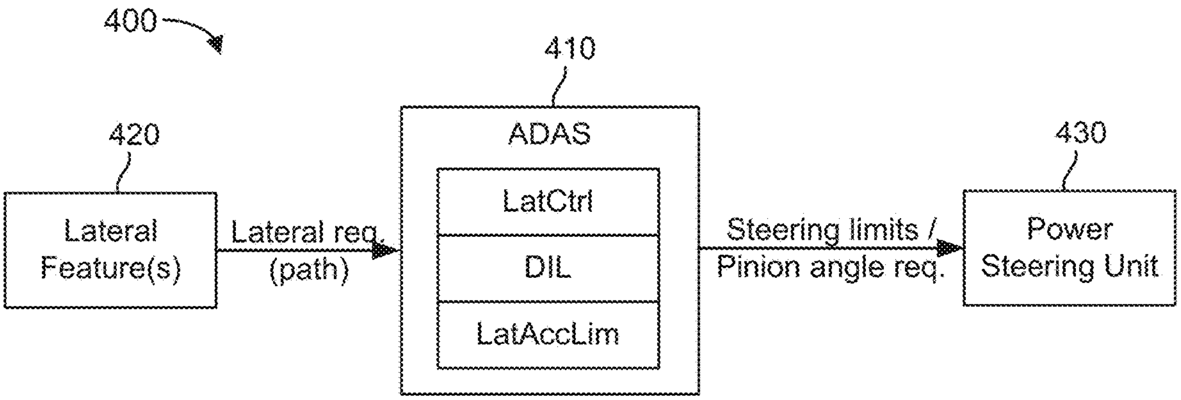
FIG. 4 is a diagram illustrating an example software architecture for an autonomous vehicle steering function, according to aspects of the disclosure.

FIG. 4 is a diagram 400 illustrating an example software architecture for an autonomous vehicle steering function, according to aspects of the disclosure. As shown in FIG. 4, an ADAS 410 includes a driver-in-the loop (DIL) component, a lateral controller (LatCtrl) component, and a lateral acceleration limiter (LatAccLim). Note that an ADAS 410 may include many other components, but for simplicity, only these three are illustrated as they relate to the steering feature of the vehicle.

The purpose of the DIL component is to ensure smooth interaction between the steering wheel input from the driver of the vehicle and the steering actuation by a lateral feature 420 (e.g., one or more traffic assist (TA) features, one or more lane keeping assistance (LKA) features). The purpose of the lateral controller is to smoothly steer the vehicle along the path (denoted as a “lateral request”) that is provided by the lateral feature 420. The purpose of the lateral acceleration limiter is to fulfill the lateral acceleration limit requirements from United Nations (UN) Regulation No. 79. According to this regulation, the lateral acceleration of specific features (e.g., the lateral feature 420) must be limited within a certain range.

Referring to the lateral controller (also referred to as the “lateral control”) in greater detail, the purpose of the lateral control is to provide a pinion angle request to the power steering unit 430 based on the requested path by the lateral feature 420. At the conceptual level, the lateral controller may not be a conventional proportional integral differential (PID) controller, insofar as the differential (D) portion does not use the same error as the proportional (P) and integral (I) portions. In some cases, the conversion to the pinion angle request may use a simplified bicycle model, meaning the bicycle model parameters are important. The feedforward part may calculate the pinion angle that is needed to keep the vehicle on a constant curvature path. The in-curve logic of the lateral control provides a factor that is multiplied on the PID values when, for example, a curvy (winding) road is detected. Currently, the lateral controller is tuned up to a TA speed limit of 135 kilometers per hour (kph). The tuning of the lateral control is feature-dependent to allow a feature-specific behavior.

Referring to the interface of the lateral control, the requested path by either the TA feature (which is an automated driving Level 2 feature) or one of the LKA features is the main input to the lateral control. A lateral control mode can switch between the different tuning sets. The main outputs of the lateral control are a pinion angle request and a pinion angle request rate limit (denoted as “steering limits” in FIG. 4). The lateral control outputs are sent to the steering torque manager, which is usually part of the power steering unit 430 that translates the received angle into torque.

Referring to the lateral acceleration limiter in greater detail, as noted above, the purpose of the lateral acceleration limiter is to fulfill the lateral acceleration limit requirements from UN Regulation No. 79. The manufacturer defines the values of the maximum lateral acceleration limits. Different maximum lateral acceleration limits may be defined for different speed ranges, but the specified maximum lateral acceleration limits may not exceed 3 meters per second squared (m/s2).

While the TA mode is active, the lateral acceleration limiter must ensure that the lateral acceleration of the vehicle does not exceed the specified maximum lateral acceleration limit by more than 0.3 m/s2, and the lateral acceleration limiter may only activate in the absence of driver input to the steering control. While the TA mode is not active, the lateral acceleration limiter is not active, either. To certify the system according to the UN Regulation No. 79, the vehicle manufacturer must demonstrate to the satisfaction of the UN Technical Service that the requirements are fulfilled.

Referring to the interface of the lateral acceleration limiter, the main inputs to the lateral acceleration limiter include the vehicle speed, yaw rate, and the steering torque that are currently applied by the respective lateral feature 420. The main outputs of the lateral acceleration limiter are torque limits (denoted “steering limits” in FIG. 4) to communicate the allowed level of steering torque by the feature to the power steering unit 430. Currently, the lateral acceleration limiter may also contain the basic torque limits for all lateral control modes. The allowed torque limits are arbitrated by the DIL component before they are sent out to the power steering unit 430.

Referring to the DIL component in greater detail, as noted above, the purpose of the DIL component is to ensure smooth interaction between the steering wheel input from the driver and the steering actuation by a lateral feature 420. The DIL component is an automated driving Level 2 feature. The DIL component is a hands-on-steering wheel feature running in parallel while a lateral feature 420 (e.g., a TA or LKA feature) is active. The DIL component should not activate while the driver has their hands on the steering wheel, even if they are not actively steering. In case the driver has their hands on the steering wheel while the vehicle is steering into a curve (but asserting low enough torque on the steering wheel to not overrule the feature), the DIL component should not interpret that input as a driver intervention and instead allow the lateral feature to remain active.

If the driver overrules the lateral feature by steering manually, the DIL component is activated. In that case, the driver feels a slight initial resistance in the steering wheel to alert the driver that their steering is contradicting the lateral feature. Once the driver has steered through this resistance, the DIL component reduces the steering wheel torque of the lateral feature. This allows the driver to steer without having to work against the lateral feature. The driver is now in control of the lateral movement of the vehicle.

When the driver reduces the manual steering or stops steering entirely, the lateral steering support of the feature is gradually ramped back in until the lateral feature is completely back in control. The tuning of the DIL component is feature-dependent to allow a feature-specific behavior. A large part of tuning the DIL component relates to the speed and intensity that the driver’s collaborative contribution is mixed with the feature’s command (e.g., torque and/or angle requests).

Referring to the interface of the DIL component, the steering wheel torque is the main input of the DIL component. The main outputs of the DIL component are the torque limits to communicate the allowed level of steering torque by the feature to the power steering unit 430. The DIL component performs the arbitration between the torque limits by the DIL component itself and the inputs coming in from the lateral acceleration limiter. Bandwidth scaling is sent out by the DIL component to allow the power steering unit 430 to react to the DIL torque limits resulting in a calmer behavior of the power steering unit 430.

Referring back to the DIL component illustrated in FIG. 4, the DIL component needs to determine whether or not a driver's touch is that driver trying to take over the steering. Currently, the DIL component is not dynamically tunable for the driver; rather, it is set by the OEM to attempt to cover the majority of driver profiles. For example, the amplitude and/or scaling of the ramp-in of the DIL component is not available or tunable. In this context, "tuning" is simply determining the sensitivity of the DIL ramp-in and/or ramp-out. This means that the amount of torque applied to the steering wheel to disengage the autonomous steering feature is the same for all drivers. It is also not intuitive to tune these parameters together as they are not part of a unified class/function. More specifically, the number of parameters that handle the ramp-in and ramp-out is too large, and they are scattered across various entry points.

The combined ramp-in and ramp-out behavior of the DIL component has a profile that resembles that of a simple attack-release (AR) envelope. The present disclosure provides techniques to apply an "envelope" to various input signals, such as the input to the DIL component, in an autonomous driving system (e.g., the example software architecture for the autonomous vehicle steering function illustrated in FIG. 4).

An envelope is a powerful tool to modulate a signal in the audio engineering field—it is generally used as a transient transfer function convoluted onto a signal (or impulse) and is triggered via an event (from that very signal). An envelope is most commonly used in amplitude modulators or filter modulation to modify the transient amplitude or the "passing" frequencies of the input (manipulated via the envelope). The parameters of an envelope can be easily set by a user.

Envelopes can be extremely simple in their various stages, such as the compounded curves used for the stages (e.g., linear, exponential, 2-pole, 4-pole, etc.). The simplest enveloping feature is an AR envelope, which provides fade in and fade out. However, it is not particularly useful other than for impulse responses. For transient responses, a variation of envelope classes exists, with an attack-sustain-release (ASR) envelope being the simplest and an attack-hold-decay-sustain-decay-release (AHDSDR) envelope being one of the most complex.

Figure 5:
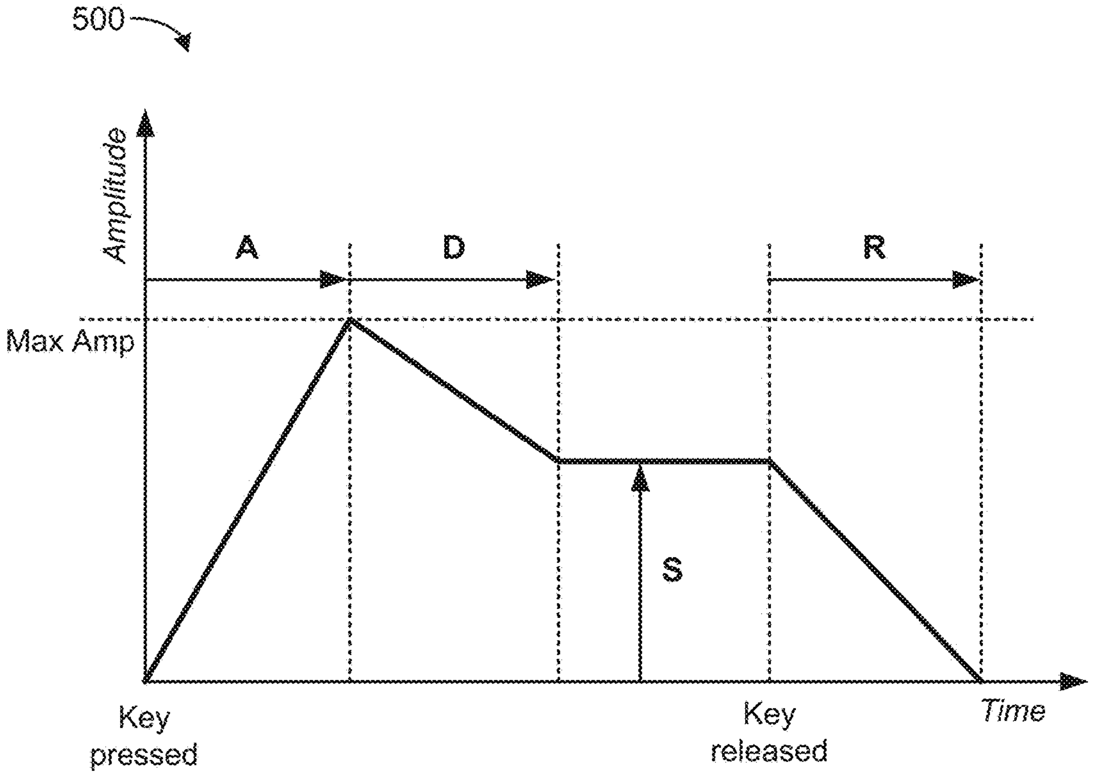
FIG. 5 is a diagram illustrating the four stages of an attack-decay-sustain-release (ADSR) envelope, according to aspects of the disclosure.

One of the most common envelopes is an attack-decay-sustain-release (ADSR) envelope—it is simple yet very versatile. FIG. 5 is a diagram 500 illustrating the four stages of an ADSR envelope, according to aspects of the disclosure. The four stages (attack, decay, sustain, and release) are described in the context of volume being the modulated signal.

"Attack" is the time taken for a note to go from 0 to full volume (maximum amplitude). For example, for plucked and percussive instruments, the time taken is an instant, but for an instrument like a theremin, the rise to full volume can be much slower. In FIG. 5, the time period of the attack is denoted "A."

"Decay" is the time taken to reach the sustain level. For example, for percussive sounds, the decay is instant. That is, these are transient sounds, with an instant high amplitude for a very short amount of time. In FIG. 5, the time period of the decay is denoted "D."

"Sustain" is the level (amplitude) at which a note is held. For example, for acoustic instruments, the sustain will have decreasing amplitude, which is why, on the plano, the note will eventually die out. On an electric guitar, however, there can be an infinite sustain by using certain devices such as ebows or sustainer pickups. Digital instruments, unconstrained by physics, can have infinite sustain. In FIG. 5, the level of the sustain is denoted "S."

"Release" is the time taken for the note to die out after it is released. For example, when the musician's finger is raised off of a plano key, the volume does not instantly drop to zero. In FIG. 5, the time period of the release is denoted "R."

To create an envelope, four values are needed for its parameters: the attack, decay, and release times and the sustain level. Note, however, that there are a few considerations. The length of the sustain stage is unknown, as a note can be held for any amount of time. The release stage is triggered only when the note is released, so there is a need for a way to indicate that release. The note can be released at any point, meaning the envelope can be in the middle of the attack or decay stages when the note is released. As such, there is a need to keep track of the current value of the envelope to calculate the release values.

ADSR envelopes are very intuitive user-tunable parameters (e.g., via knobs and/or sliders and/or visual/graphical interface similar to diagram 500 of FIG. 5) for musicians or audio engineers to easily visualize and manipulate time-based ramp-in (i.e., attack) and ramp-out (i.e., release) of the controlled signal or the user's collaboration with the synthesizer computer's other feature(s). This is similar to the problem of fading in or out of the intensity of the collaboration between, for example, the DIL component being triggered by the driver while the lateral control is triggered (e.g., by TA in a curve). As such, an ADSR envelope could be applied to the input to the DIL, for example, and a user (e.g., the driver) may be permitted to tune the parameters of the ADSR envelope to enable the user to modulate the feeling and the behavior of the DIL component. Moreover, the triggering of the DIL can be provided as part of the ASR/ADSR envelope class/function.

Figure 6:
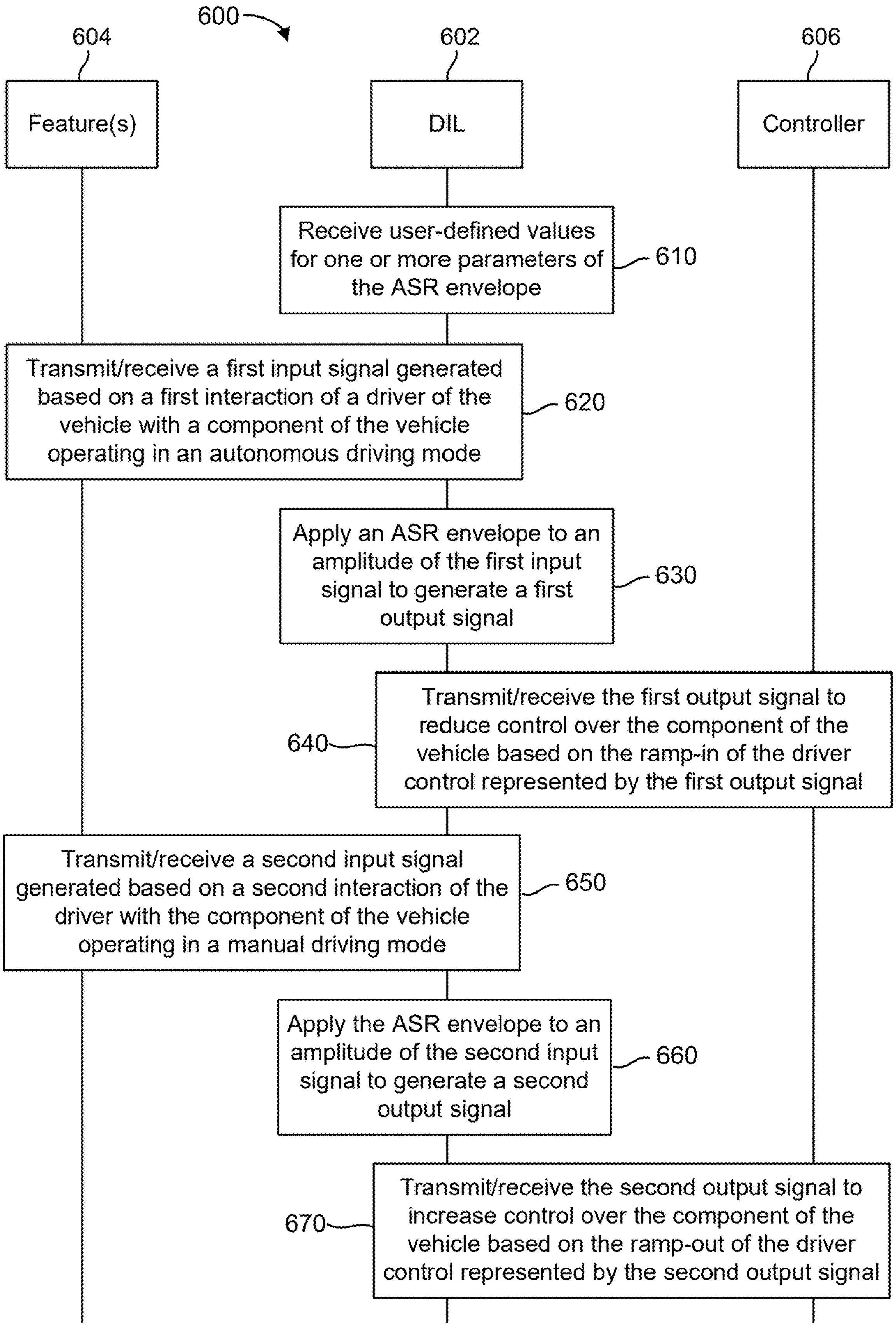
FIG. 6 illustrates an example signaling diagram for operating a driver-in-the-loop (DIL) component of a vehicle, according to aspects of the disclosure.

FIG. 6 illustrates an example signaling diagram 600 for operating a DIL component 602 of a vehicle, according to aspects of the disclosure. The illustrated signaling may be performed among a DIL component 602 (e.g., the DIL component illustrated in FIG. 4), one or more features 604 (which may correspond to the lateral feature 420), and a controller module 606 (e.g., the power steering unit 430).

At stage 610, the DIL component 602 receives, from a user interface of the vehicle (not shown), user-defined values for one or more parameters of an ASR envelope (which may be an ASR envelope or an ADSR envelop, as an ASR envelope is a subset of an ADSR envelope). An ASR envelope will cover the basic functionality of DIL ramp-in/ramp-out. An ADSR envelope will provide versatility to allow scaling of torques and the like, or fast accumulation types of mechanisms, which are also useful in special scenarios such LKA, trucks, and the like.

The user-defined values for the one or more parameters may be set by the driver (or other user) of the vehicle via the user interface of the vehicle (e.g., an infotainment head unit (IHU) of the vehicle or some other human-machine interface (HMI), an application running on a connected "smartphone," or the like) by, for example, dragging a slider to adjust the value of a parameter. The one or more parameters may include an amount of time for an attack period of the ASR envelope, an amount of time for a sustain period of the ASR envelope, an amount of time for a release period of the ASR envelope, or any combination thereof. There may be default/preset values for the one or more parameters that the driver can update. There may also be absolute limits for the maximum and minimum values of the one or more parameters, thereby restraining the driver within permissible ranges for the one or more parameters.

In an aspect, the DIL component 602 may compare the user-defined values for the one or more parameters to preset limits for the one or more parameters. If necessary, the DIL component 602 may reduce any user-defined values of the one or more parameters that exceed the preset limits for the one or more parameters to no greater than the preset limits for the one or more parameters. The preset limits for the one or more parameters may be received from a lateral acceleration limiter component of the vehicle (e.g., the LatAccLim component illustrated in FIG. 4), a lateral control component of the vehicle (e.g., the LatCtrl component illustrated in FIG. 4), or both. The preset limits for the one or more parameters may be based on a current speed of the vehicle, regulatory requirements, or both.

At stage 620, a feature 604 transmits, and the DIL component 602 receives, a first input signal generated based on a first interaction of a driver of the vehicle with a component of the vehicle operating in an autonomous driving mode. For example, the component of the vehicle may be the steering wheel of the vehicle, the first interaction may be the user applying torque to the steering wheel, and the first input signal may represent an amount of torque applied to the steering wheel. As another example, the component of the vehicle may be a pinion or a wheel of the vehicle, and the first input signal may represent a steering angle of the pinion or wheel.

At stage 630, the DIL component 602 applies the ASR envelope to an amplitude of the first input signal to generate a first output signal. The first output signal represents at least a ramp-in of driver control over the component of the vehicle from no driver control to full driver control. The ramp-in of the driver control is limited by application of the ASR envelope to the amplitude of the first input signal.

In an aspect, the first input signal may be included, or be associated with, a flag indicating that the driver is interacting with the component of the vehicle. The DIL component 602 may then apply the ASR envelope in response to detection of the flag. Alternatively, the impulse of the input signal may be above some threshold, thereby indicating that the driver is interacting with the component of the vehicle.

At stage 640, the DIL component 602 transmits, and the controller module 606 for the component of the vehicle receives, the first output signal to enable the controller module 606 to reduce control over the component of the vehicle based on the ramp-in of the driver control represented by the first output signal.

At stage 650, at some time later, the feature 604 transmits, and the DIL component 602 receives, a second input signal generated based on a second interaction of the driver of the vehicle with the component of the vehicle operating in a manual driving mode. The second interaction may be the user releasing the steering wheel of the vehicle.

At stage 660, the DIL component 602 applies the ASR envelope to an amplitude of the second input signal to generate a second output signal. The second output signal represents at least a ramp-out of driver control over the component of the vehicle from full driver control to no driver control. The ramp-out of the driver control is limited by application of the ASR envelope to the amplitude of the second input signal.

At stage 670, the DIL component 602 transmits, and the controller module 606 receives, the second output signal to enable the controller module 606 to increase control over the component of the vehicle based on the ramp-out of the driver control represented by the second output signal.

Figure 7:
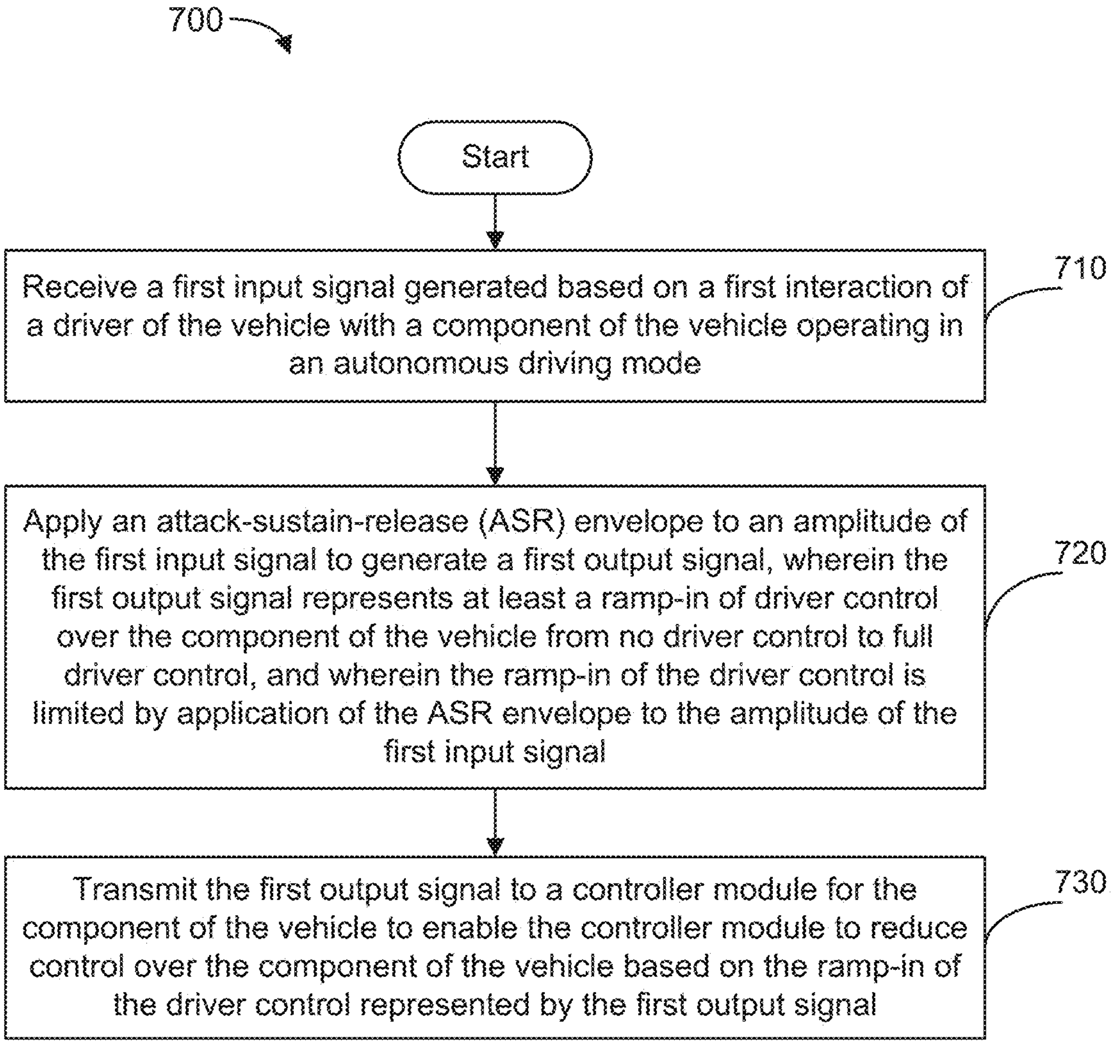
FIG. 7 illustrates an example method of operating a DIL component of a vehicle, according to aspects of the disclosure.

FIG. 7 illustrates an example method 700 of operating a DIL component of a vehicle (e.g., DIL component 602), according to aspects of the disclosure.

At 710, the DIL component receives a first input signal generated based on a first interaction of a driver of the vehicle with a component of the vehicle operating in an autonomous driving mode. In an aspect, operation 710 may be performed by the DIL component 318 in combination with the data bus 308, the one or more processors 306, and/or memory 304, any or all of which may be considered means for performing this operation.

At 720, the DIL component applies an ASR envelope to an amplitude of the first input signal to generate a first output signal, wherein the first output signal represents at least a ramp-in of driver control over the component of the vehicle from no driver control to full driver control, and wherein the ramp-in of the driver control is limited by application of the ASR envelope to the amplitude of the first input signal. In an aspect, operation 720 may be performed by the DIL component 318 in combination with the data bus 308, the one or more processors 306, and/or memory 304, any or all of which may be considered means for performing this operation.

At 730, the DIL component transmits the first output signal to a controller module for the component of the vehicle to enable the controller module to reduce control over the component of the vehicle based on the ramp-in of the driver control represented by the first output signal. In an aspect, operation 730 may be performed by the DIL component 318 in combination with the data bus 308, the one or more processors 306, and/or memory 304, any or all of which may be considered means for performing this operation.

As will be appreciated, a technical advantage of the method 700 is allowing greater customization to the operation of the DIL component through the use of the user-adjustable ASR envelope. In addition, the unified class/entry point can provide a faster and more computationally stable (less demanding) model for the DIL component. The ability to have "per driver" tuning also presents a greater opportunity to provide safer AD(A)S features due to the ability to address more complex cases that are not as accessible via a more generalized tuning due to the limitations of how the DIL component would behave with drivers outside standard deviation.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an electrical insulator and an electrical conductor). Furthermore, it is also intended that aspects of a clause can be included in any other independent clause, even if the clause is not directly dependent on the independent clause.

Implementation examples are described in the following numbered clauses:

Clause 1. A method performed by a driver-in-the-loop (DIL) component of a vehicle, comprising: receiving a first input signal generated based on a first interaction of a driver of the vehicle with a component of the vehicle operating in an autonomous driving mode; applying an attack-sustain-release (ASR) envelope to an amplitude of the first input signal to generate a first output signal, wherein the first output signal represents at least a ramp-in of driver control over the component of the vehicle from no driver control to full driver control, and wherein the ramp-in of the driver control is limited by application of the ASR envelope to the amplitude of the first input signal; and transmitting the first output signal to a controller module for the component of the vehicle to enable the controller module to reduce control over the component of the vehicle based on the ramp-in of the driver control represented by the first output signal.

Clause 2. The method of clause 1, further comprising: receiving a second input signal generated based on a second interaction of the driver of the vehicle with the component of the vehicle operating in a manual driving mode; applying the ASR envelope to an amplitude of the second input signal to generate a second output signal, wherein the second output signal represents at least a ramp-out of driver control over the component of the vehicle from full driver control to no driver control, and wherein the ramp-out of the driver control is limited by application of the ASR envelope to the amplitude of the second input signal; and transmitting the second output signal to the controller module for the component of the vehicle to enable the controller module to increase control over the component of the vehicle based on the ramp-out of the driver control represented by the second output signal.

Clause 3. The method of any of clauses 1 to 2, further comprising: receiving user-defined values for one or more parameters of the ASR envelope.

Clause 4. The method of clause 3, wherein the user-defined values for the one or more parameters are received from a user interface of the vehicle.

Clause 5. The method of clause 4, wherein the user-defined values for the one or more parameters are set by the driver of the vehicle via the user interface of the vehicle.

Clause 6. The method of any of clauses 4 to 5, wherein the user interface comprises an infotainment head unit (IHU) of the vehicle.

Clause 7. The method of any of clauses 3 to 6, wherein the one or more parameters comprise: an amount of time for an attack period of the ASR envelope, an amount of time for a sustain period of the ASR envelope, an amount of time for a release period of the ASR envelope, or any combination thereof.

Clause 8. The method of any of clauses 3 to 7, further comprising: comparing the user-defined values for the one or more parameters to preset limits for the one or more parameters; and reducing any user-defined values of the one or more parameters that exceed the preset limits for the one or more parameters to no greater than the preset limits for the one or more parameters.

Clause 9. The method of clause 8, wherein the preset limits for the one or more parameters are received from: a lateral acceleration limiter component of the vehicle, a lateral control component of the vehicle, or any combination thereof.

Clause 10. The method of any of clauses 8 to 9, wherein the preset limits for the one or more parameters are based on: a current speed of the vehicle, regulatory requirements, or any combination thereof.

Clause 11. The method of any of clauses 1 to 10, wherein the ASR envelope comprises an attack-decay-sustain-release (ADSR) envelope.

Clause 12. The method of any of clauses 1 to 11, wherein: the component of the vehicle is a steering wheel of the vehicle, and the first input signal represents an amount of torque applied to the steering wheel.

Clause 13. The method of any of clauses 1 to 11, wherein: the component of the vehicle is a pinion or wheel of the vehicle, and the first input signal represents a steering angle of the pinion or wheel.

Clause 14. The method of any of clauses 1 to 13, wherein the controller module comprises: a power steering unit of the vehicle, or a steering torque manager of the vehicle.

Clause 15. The method of any of clauses 1 to 14, wherein the first input signal is received from: a lane-keeping assistance (LKA) feature of the vehicle, a traffic assist feature of the vehicle, or an advanced driver-assistance system (ADAS) of the vehicle.

Clause 16. An apparatus, comprising: one or more memories; one or more transceivers; and one or more processors communicatively coupled to the one or more memories and the one or more transceivers, the one or more processors configured to: receive, via the one or more transceivers, a first input signal generated based on a first interaction of a driver of a vehicle with a component of the vehicle operating in an autonomous driving mode; apply an attack-sustain-release (ASR) envelope to an amplitude of the first input signal to generate a first output signal, wherein the first output signal represents at least a ramp-in of driver control over the component of the vehicle from no driver control to full driver control, and wherein the ramp-in of the driver control is limited by application of the ASR envelope to the amplitude of the first input signal; and transmit, via the one or more transceivers, the first output signal to a controller module for the component of the vehicle to enable the controller module to reduce control over the component of the vehicle based on the ramp-in of the driver control represented by the first output signal.

Clause 17. The apparatus of clause 16, wherein the one or more processors are further configured to: receive, via the one or more transceivers, a second input signal generated based on a second interaction of the driver of the vehicle with the component of the vehicle operating in a manual driving mode; apply the ASR envelope to an amplitude of the second input signal to generate a second output signal, wherein the second output signal represents at least a ramp-out of driver control over the component of the vehicle from full driver control to no driver control, and wherein the ramp-out of the driver control is limited by application of the ASR envelope to the amplitude of the second input signal; and transmit, via the one or more transceivers, the second output signal to the controller module for the component of the vehicle to enable the controller module to increase control over the component of the vehicle based on the ramp-out of the driver control represented by the second output signal.

Clause 18. The apparatus of any of clauses 16 to 17, wherein the one or more processors are further configured to: receive, via the one or more transceivers, user-defined values for one or more parameters of the ASR envelope.

Clause 19. The apparatus of clause 18, wherein the user-defined values for the one or more parameters are received from a user interface of the vehicle.

Clause 20. The apparatus of clause 19, wherein the user-defined values for the one or more parameters are set by the driver of the vehicle via the user interface of the vehicle.

Clause 21. The apparatus of any of clauses 19 to 20, wherein the user interface comprises an infotainment head unit (IHU) of the vehicle.

Clause 22. The apparatus of any of clauses 18 to 21, wherein the one or more parameters comprise: an amount of time for an attack period of the ASR envelope, an amount of time for a sustain period of the ASR envelope, an amount of time for a release period of the ASR envelope, or any combination thereof.

Clause 23. The apparatus of any of clauses 18 to 22, wherein the one or more processors are further configured to: compare the user-defined values for the one or more parameters to preset limits for the one or more parameters; and reduce any user-defined values of the one or more parameters that exceed the preset limits for the one or more parameters to no greater than the preset limits for the one or more parameters.

Clause 24. The apparatus of clause 23, wherein the preset limits for the one or more parameters are received from: a lateral acceleration limiter component of the vehicle, a lateral control component of the vehicle, or any combination thereof.

Clause 25. The apparatus of any of clauses 23 to 24, wherein the preset limits for the one or more parameters are based on: a current speed of the vehicle, regulatory requirements, or any combination thereof.

Clause 26. The apparatus of any of clauses 16 to 25, wherein the ASR envelope comprises an attack-decay-sustain-release (ADSR) envelope.

Clause 27. The apparatus of any of clauses 16 to 26, wherein: the component of the vehicle is a steering wheel of the vehicle, and the first input signal represents an amount of torque applied to the steering wheel.

Clause 28. The apparatus of any of clauses 16 to 26, wherein: the component of the vehicle is a pinion or wheel of the vehicle, and the first input signal represents a steering angle of the pinion or wheel.

Clause 29. The apparatus of any of clauses 16 to 28, wherein the controller module comprises: a power steering unit of the vehicle, or a steering torque manager of the vehicle.

Clause 30. The apparatus of any of clauses 16 to 29, wherein the first input signal is received from: a lane-keeping assistance (LKA) feature of the vehicle, a traffic assist feature of the vehicle, or an advanced driver-assistance system (ADAS) of the vehicle.

Clause 31. An apparatus, comprising: means for receiving a first input signal generated based on a first interaction of a driver of a vehicle with a component of the vehicle operating in an autonomous driving mode; means for applying an attack-sustain-release (ASR) envelope to an amplitude of the first input signal to generate a first output signal, wherein the first output signal represents at least a ramp-in of driver control over the component of the vehicle from no driver control to full driver control, and wherein the ramp-in of the driver control is limited by application of the ASR envelope to the amplitude of the first input signal; and means for transmitting the first output signal to a controller module for the component of the vehicle to enable the controller module to reduce control over the component of the vehicle based on the ramp-in of the driver control represented by the first output signal.

Clause 32. The apparatus of clause 31, further comprising: means for receiving a second input signal generated based on a second interaction of the driver of the vehicle with the component of the vehicle operating in a manual driving mode; means for applying the ASR envelope to an amplitude of the second input signal to generate a second output signal, wherein the second output signal represents at least a ramp-out of driver control over the component of the vehicle from full driver control to no driver control, and wherein the ramp-out of the driver control is limited by application of the ASR envelope to the amplitude of the second input signal; and means for transmitting the second output signal to the controller module for the component of the vehicle to enable the controller module to increase control over the component of the vehicle based on the ramp-out of the driver control represented by the second output signal.

Clause 33. The apparatus of any of clauses 31 to 32, further comprising: means for receiving user-defined values for one or more parameters of the ASR envelope.

Clause 34. The apparatus of clause 33, wherein the user-defined values for the one or more parameters are received from a user interface of the vehicle.

Clause 35. The apparatus of clause 34, wherein the user-defined values for the one or more parameters are set by the driver of the vehicle via the user interface of the vehicle.

Clause 36. The apparatus of any of clauses 34 to 35, wherein the user interface comprises an infotainment head unit (IHU) of the vehicle.

Clause 37. The apparatus of any of clauses 33 to 36, wherein the one or more parameters comprise: an amount of time for an attack period of the ASR envelope, an amount of time for a sustain period of the ASR envelope, an amount of time for a release period of the ASR envelope, or any combination thereof.

Clause 38. The apparatus of any of clauses 33 to 37, further comprising: means for comparing the user-defined values for the one or more parameters to preset limits for the one or more parameters; and means for reducing any user-defined values of the one or more parameters that exceed the preset limits for the one or more parameters to no greater than the preset limits for the one or more parameters.

Clause 39. The apparatus of clause 38, wherein the preset limits for the one or more parameters are received from: a lateral acceleration limiter component of the vehicle, a lateral control component of the vehicle, or any combination thereof.

Clause 40. The apparatus of any of clauses 38 to 39, wherein the preset limits for the one or more parameters are based on: a current speed of the vehicle, regulatory requirements, or any combination thereof.

Clause 41. The apparatus of any of clauses 31 to 40, wherein the ASR envelope comprises an attack-decay-sustain-release (ADSR) envelope.

Clause 42. The apparatus of any of clauses 31 to 41, wherein: the component of the vehicle is a steering wheel of the vehicle, and the first input signal represents an amount of torque applied to the steering wheel.

Clause 43. The apparatus of any of clauses 31 to 41, wherein: the component of the vehicle is a pinion or wheel of the vehicle, and the first input signal represents a steering angle of the pinion or wheel.

Clause 44. The apparatus of any of clauses 31 to 43, wherein the controller module comprises: a power steering unit of the vehicle, or a steering torque manager of the vehicle.

Clause 45. The apparatus of any of clauses 31 to 44, wherein the first input signal is received from: a lane-keeping assistance (LKA) feature of the vehicle, a traffic assist feature of the vehicle, or an advanced driver-assistance system (ADAS) of the vehicle.

Clause 46. A non-transitory computer-readable medium storing computer-executable instructions that, when executed by a driver-in-the-loop (DIL) component, cause the DIL component to: receive a first input signal generated based on a first interaction of a driver of a vehicle with a component of the vehicle operating in an autonomous driving mode; apply an attack-sustain-release (ASR) envelope to an amplitude of the first input signal to generate a first output signal, wherein the first output signal represents at least a ramp-in of driver control over the component of the vehicle from no driver control to full driver control, and wherein the ramp-in of the driver control is limited by application of the ASR envelope to the amplitude of the first input signal; and transmit the first output signal to a controller module for the component of the vehicle to enable the controller module to reduce control over the component of the vehicle based on the ramp-in of the driver control represented by the first output signal.

Clause 47. The non-transitory computer-readable medium of clause 46, further comprising computer-executable instructions that, when executed by the DIL component, cause the DIL component to: receive a second input signal generated based on a second interaction of the driver of the vehicle with the component of the vehicle operating in a manual driving mode; apply the ASR envelope to an amplitude of the second input signal to generate a second output signal, wherein the second output signal represents at least a ramp-out of driver control over the component of the vehicle from full driver control to no driver control, and wherein the ramp-out of the driver control is limited by application of the ASR envelope to the amplitude of the second input signal; and transmit the second output signal to the controller module for the component of the vehicle to enable the controller module to increase control over the component of the vehicle based on the ramp-out of the driver control represented by the second output signal.

Clause 48. The non-transitory computer-readable medium of any of clauses 46 to 47, further comprising computer-executable instructions that, when executed by the DIL component, cause the DIL component to: receive user-defined values for one or more parameters of the ASR envelope.

Clause 49. The non-transitory computer-readable medium of clause 48, wherein the user-defined values for the one or more parameters are received from a user interface of the vehicle.

Clause 50. The non-transitory computer-readable medium of clause 49, wherein the user-defined values for the one or more parameters are set by the driver of the vehicle via the user interface of the vehicle.

Clause 51. The non-transitory computer-readable medium of any of clauses 49 to 50, wherein the user interface comprises an infotainment head unit (IHU) of the vehicle.

Clause 52. The non-transitory computer-readable medium of any of clauses 48 to 51, wherein the one or more parameters comprise: an amount of time for an attack period of the ASR envelope, an amount of time for a sustain period of the ASR envelope, an amount of time for a release period of the ASR envelope, or any combination thereof.

Clause 53. The non-transitory computer-readable medium of any of clauses 48 to 52, further comprising computer-executable instructions that, when executed by the DIL component, cause the DIL component to: compare the user-defined values for the one or more parameters to preset limits for the one or more parameters; and reduce any user-defined values of the one or more parameters that exceed the preset limits for the one or more parameters to no greater than the preset limits for the one or more parameters.

Clause 54. The non-transitory computer-readable medium of clause 53, wherein the preset limits for the one or more parameters are received from: a lateral acceleration limiter component of the vehicle, a lateral control component of the vehicle, or any combination thereof.

Clause 55. The non-transitory computer-readable medium of any of clauses 53 to 54, wherein the preset limits for the one or more parameters are based on: a current speed of the vehicle, regulatory requirements, or any combination thereof.

Clause 56. The non-transitory computer-readable medium of any of clauses 46 to 55, wherein the ASR envelope comprises an attack-decay-sustain-release (ADSR) envelope.

Clause 57. The non-transitory computer-readable medium of any of clauses 46 to 56, wherein: the component of the vehicle is a steering wheel of the vehicle, and the first input signal represents an amount of torque applied to the steering wheel.

Clause 58. The non-transitory computer-readable medium of any of clauses 46 to 56, wherein: the component of the vehicle is a pinion or wheel of the vehicle, and the first input signal represents a steering angle of the pinion or wheel.

Clause 59. The non-transitory computer-readable medium of any of clauses 46 to 58, wherein the controller module comprises: a power steering unit of the vehicle, or a steering torque manager of the vehicle.

Clause 60. The non-transitory computer-readable medium of any of clauses 46 to 59, wherein the first input signal is received from: a lane-keeping assistance (LKA) feature of the vehicle, a traffic assist feature of the vehicle, or an advanced driver-assistance system (ADAS) of the vehicle.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. For example, the functions, steps and/or actions of the method claims in accordance with the aspects of the disclosure described herein need not be performed in any particular order. Further, no component, function, action, or instruction described or claimed herein should be construed as critical or essential unless explicitly described as such. Furthermore, as used herein, the terms "set," "group," and the like are intended to include one or more items and may be used interchangeably with "at least one," "one or more," and the like. Also, as used herein, the terms "has," "have," "having," and the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of") or the alternatives are mutually exclusive (e.g., "one or more" should not be interpreted as "one and more"). Furthermore, although components, functions, actions, and instructions may be described or claimed in the singular, the plural is contemplated unless limitation to the singular is explicitly stated. Accordingly, as used herein, the articles "a," "an," "the," and "said" are intended to include one or more items and may be used interchangeably with "at least one," "one or more," and the like. Additionally, as used herein, the terms "at least one" and "one or more" encompass "one" component, function, action, or instruction performing or capable of performing a described or claimed functionality and also "two or more" components, functions, actions, or instructions performing or capable of performing a described or claimed functionality in combination.

What is claimed is:

1. A method performed by a driver-in-the-loop (DIL) component of a vehicle, comprising:

receiving user-defined values for one or more parameters of a plurality of parameters of a signal modulator, wherein the plurality of parameters includes at least an amount of time for an attack period of the signal modulator, an amount of time for a sustain period of the signal modulator, and an amount of time for a release period of the signal modulator;

receiving a first input signal generated based on a first interaction of a driver of the vehicle with a component of the vehicle operating in an autonomous driving mode;

applying the signal modulator to an amplitude of the first input signal to generate a first output signal, wherein the signal modulator is configured according to the plurality of parameters, wherein the first output signal represents at least a ramp-in of driver control over the component of the vehicle from no driver control to full driver control, and wherein the ramp-in of the driver control is limited by application of the signal modulator to the amplitude of the first input signal; and transmitting the first output signal to a controller module for the component of the vehicle to enable the controller module to reduce control over the component of the vehicle based on the ramp-in of the driver control represented by the first output signal.

2. The method of claim 1, further comprising:

receiving a second input signal generated based on a second interaction of the driver of the vehicle with the component of the vehicle operating in a manual driving mode;

applying the signal modulator to an amplitude of the second input signal to generate a second output signal, wherein the second output signal represents at least a ramp-out of driver control over the component of the vehicle from full driver control to no driver control, and wherein the ramp-out of the driver control is limited by application of the signal modulator to the amplitude of the second input signal; and transmitting the second output signal to the controller module for the component of the vehicle to enable the controller module to increase control over the component of the vehicle based on the ramp-out of the driver control represented by the second output signal.

3. The method of claim 1, wherein the user-defined values for the one or more parameters are received from a user interface of the vehicle.

4. The method of claim 3, wherein the user-defined values for the one or more parameters are set by the driver of the vehicle via the user interface of the vehicle.

5. The method of claim 3, wherein the user interface comprises an infotainment head unit (IHU) of the vehicle.

6. The method of claim 1, further comprising:

comparing the user-defined values for the one or more parameters to preset limits for the one or more parameters; and reducing any user-defined values of the one or more parameters that exceed the preset limits for the one or more parameters to no greater than the preset limits for the one or more parameters.

7. The method of claim 6, wherein the preset limits for the one or more parameters are received from:

a lateral acceleration limiter component of the vehicle,
a lateral control component of the vehicle, or
any combination thereof.

8. The method of claim 6, wherein the preset limits for the one or more parameters are based on:

a current speed of the vehicle,
regulatory requirements, or
any combination thereof.

9. The method of claim 1, wherein the signal modulator comprises an attack-decay-sustain-release (ADSR) envelope.

10. The method of claim 1, wherein:

the component of the vehicle is a steering wheel of the vehicle, and the first input signal represents an amount of torque applied to the steering wheel.

11. The method of claim 1, wherein:

the component of the vehicle is a pinion or wheel of the vehicle, and the first input signal represents a steering angle of the pinion or wheel.

12. The method of claim 1, wherein the controller module comprises:

a power steering unit of the vehicle, or
a steering torque manager of the vehicle.

13. The method of claim 1, wherein the first input signal is received from:

a lane-keeping assistance (LKA) feature of the vehicle,
a traffic assist feature of the vehicle, or
an advanced driver-assistance system (ADAS) of the vehicle.

14. An apparatus, comprising:

one or more memories; and one or more processors communicatively coupled to the one or more memories, the one or more processors, either alone or in combination, configured to:

receive user-defined values for one or more parameters of a plurality of parameters of a signal modulator, wherein the plurality of parameters includes at least an amount of time for an attack period of the signal modulator, an amount of time for a sustain period of the signal modulator, and an amount of time for a release period of the signal modulator;

receive a first input signal generated based on a first interaction of a driver of a vehicle with a component of the vehicle operating in an autonomous driving mode;

apply the signal modulator to an amplitude of the first input signal to generate a first output signal, wherein the signal modulator is configured according to the plurality of parameters, wherein the first output signal represents at least a ramp-in of driver control over the component of the vehicle from no driver control to full driver control, and wherein the ramp-in of the driver control is limited by application of the signal modulator to the amplitude of the first input signal; and transmit the first output signal to a controller module for the component of the vehicle to enable the controller module to reduce control over the component of the vehicle based on the ramp-in of the driver control represented by the first output signal.

15. The apparatus of claim 14, wherein the one or more processors are further configured to:

receive a second input signal generated based on a second interaction of the driver of the vehicle with the component of the vehicle operating in a manual driving mode;

apply the signal modulator to an amplitude of the second input signal to generate a second output signal, wherein the second output signal represents at least a ramp-out of driver control over the component of the vehicle from full driver control to no driver control, and wherein the ramp-out of the driver control is limited by application of the signal modulator to the amplitude of the second input signal; and transmit the second output signal to the controller module for the component of the vehicle to enable the controller module to increase control over the component of the vehicle based on the ramp-out of the driver control represented by the second output signal.

16. The apparatus of claim 14, wherein the user-defined values for the one or more parameters are received from a user interface of the vehicle.

17. The apparatus of claim 16, wherein the user-defined values for the one or more parameters are set by the driver of the vehicle via the user interface of the vehicle.

18. The apparatus of claim 16, wherein the user interface comprises an infotainment head unit (IHU) of the vehicle.

19. The apparatus of claim 16, wherein the one or more processors are further configured to:

compare the user-defined values for the one or more parameters to preset limits for the one or more parameters; and reduce any user-defined values of the one or more parameters that exceed the preset limits for the one or more parameters to no greater than the preset limits for the one or more parameters.

20. The apparatus of claim 19, wherein the preset limits for the one or more parameters are received from:

a lateral acceleration limiter component of the vehicle, a lateral control component of the vehicle, or any combination thereof.

21. The apparatus of claim 19, wherein the preset limits for the one or more parameters are based on:

a current speed of the vehicle, regulatory requirements, or any combination thereof.

22. The apparatus of claim 14, wherein the signal modulator comprises an attack-decay-sustain-release (ADSR) envelope.

23. The apparatus of claim 14, wherein the controller module comprises:

a power steering unit of the vehicle, or a steering torque manager of the vehicle.

24. The apparatus of claim 14, wherein the first input signal is received from:

a lane-keeping assistance (LKA) feature of the vehicle, a traffic assist feature of the vehicle, or an advanced driver-assistance system (ADAS) of the vehicle.

25. An apparatus, comprising:

means for receiving user-defined values for one or more parameters of a plurality of parameters of a signal modulator, wherein the plurality of parameters includes at least an amount of time for an attack period of the signal modulator, an amount of time for a sustain period of the signal modulator, and an amount of time for a release period of the signal modulator;

means for receiving a first input signal generated based on a first interaction of a driver of a vehicle with a component of the vehicle operating in an autonomous driving mode;

means for applying the signal modulator to an amplitude of the first input signal to generate a first output signal, wherein the signal modulator is configured according to the plurality of parameters, wherein the first output signal represents at least a ramp-in of driver control over the component of the vehicle from no driver control to full driver control, and wherein the ramp-in of the driver control is limited by application of the signal modulator to the amplitude of the first input signal; and means for transmitting the first output signal to a controller module for the component of the vehicle to enable the controller module to reduce control over the component of the vehicle based on the ramp-in of the driver control represented by the first output signal.

26. A non-transitory computer-readable medium storing computer-executable instructions that, when executed by a driver-in-the-loop (DIL) component, cause the DIL component to:

receive user-defined values for one or more parameters of a plurality of parameters of a signal modulator, wherein the plurality of parameters includes at least an amount of time for an attack period of the signal modulator, an amount of time for a sustain period of the signal modulator, and an amount of time for a release period of the signal modulator;

receive a first input signal generated based on a first interaction of a driver of a vehicle with a component of the vehicle operating in an autonomous driving mode;

apply the signal modulator to an amplitude of the first input signal to generate a first output signal, wherein the signal modulator is configured according to the plurality of parameters, wherein the first output signal represents at least a ramp-in of driver control over the component of the vehicle from no driver control to full driver control, and wherein the ramp-in of the driver control is limited by application of the signal modulator to the amplitude of the first input signal; and transmit the first output signal to a controller module for the component of the vehicle to enable the controller module to reduce control over the component of the vehicle based on the ramp-in of the driver control represented by the first output signal.

* * * * *